United States Patent
Bushnell et al.

[11] 3,899,299
[45] Aug. 12, 1975

[54] EXTRACTION APPARATUS

[75] Inventors: James D. Bushnell, Berkeley Heights; Robert J. Fiocco, Summit, both of N.J.

[73] Assignee: Exxon Research and Engineering Company, Linden, N.J.

[22] Filed: May 21, 1973

[21] Appl. No.: 362,489

[52] U.S. Cl. ............ 23/270.5; 196/14.52; 202/158; 210/511; 210/DIG. 5; 261/114 R
[51] Int. Cl. ...................... B01d 11/04; B01d 59/24
[58] Field of Search .......... 23/267 R, 270 R, 270.5, 23/283; 196/14.52; 210/21, 511, DIG. 5; 261/114 R; 202/158

[56] References Cited
UNITED STATES PATENTS

| 2,364,892 | 12/1944 | Elgin | 196/14.52 X |
|---|---|---|---|
| 2,658,737 | 11/1953 | Nutter | 202/158 X |
| 2,710,790 | 6/1955 | Rupp et al. | 23/270.5 X |
| 2,721,790 | 10/1955 | Olney | 196/14.52 X |
| 2,777,758 | 1/1957 | Pokorny et al. | 23/270.5 |
| 2,791,536 | 5/1957 | Saxton | 210/21 X |
| 2,795,536 | 6/1957 | Grossberg et al. | 202/158 X |
| 2,861,027 | 11/1958 | Farmer | 210/511 X |
| 3,223,244 | 12/1965 | Topol et al. | 210/DIG. 5 |
| 3,233,879 | 2/1966 | Mitchell | 202/158 X |

FOREIGN PATENTS OR APPLICATIONS

| 790,436 | 2/1958 | United Kingdom | 210/21 |

*Primary Examiner*—Samih N. Zaharna
*Assistant Examiner*—Robert H. Spitzer
*Attorney, Agent, or Firm*—Edward M. Corcoran

[57] ABSTRACT

The light phase in a liquid-liquid extraction tower having vertically spaced cross flow trays and seal box means for dividing the intertray spacing into dispersing and settling zones is flowed to a tray dispersing zone. The tray dispersing zone has a seal box including an aperture means and means for automatically varying the effective cross sectional area of the aperture means presented to the light phase substantially in accordance with variations in the level of the light phase beneath the tray. Relatively large variation in average light phase flow rate can then be accommodated as necessary for different feed rates or raffinate yields while maintaining the flow rate of the light phase substantially constant with time for any given operation (i.e., avoidance of undesirable cycling).

9 Claims, 5 Drawing Figures

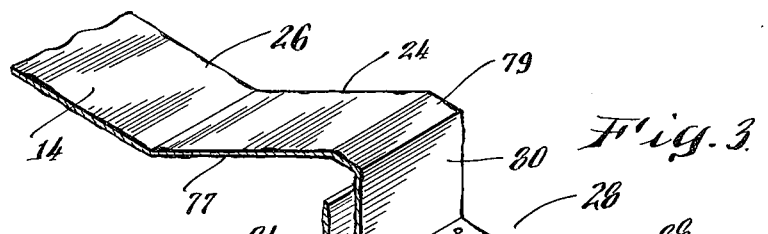
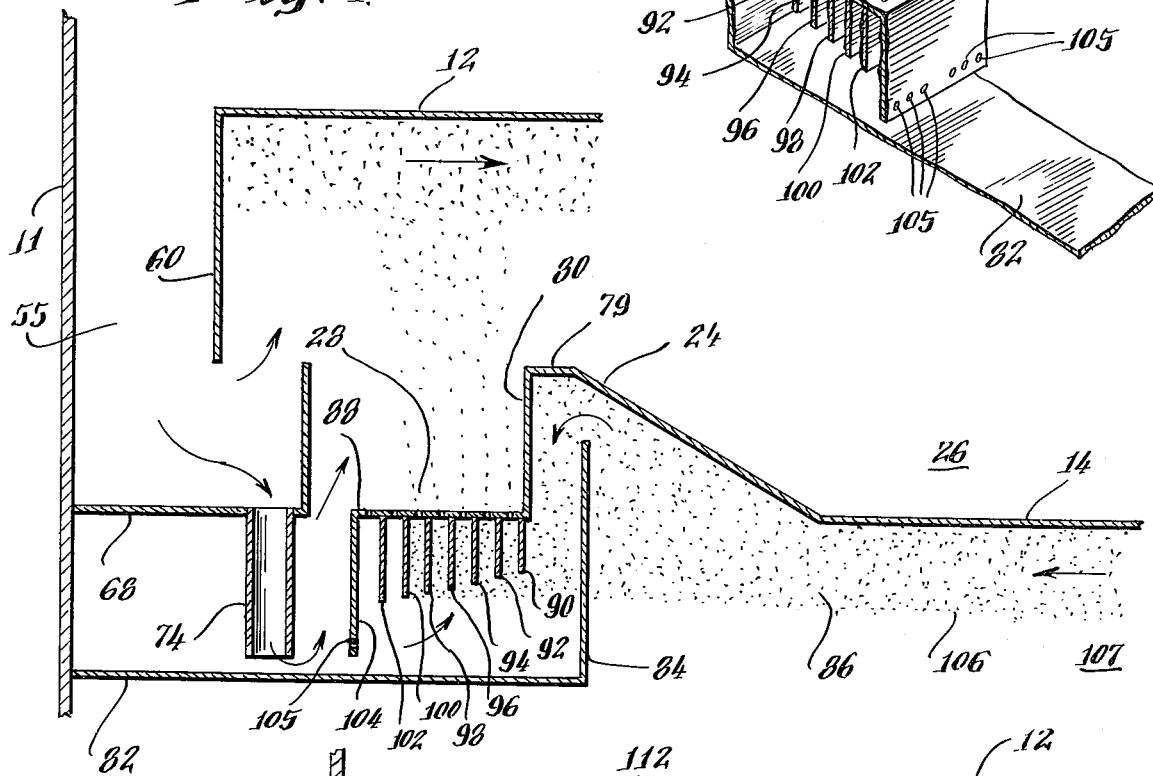
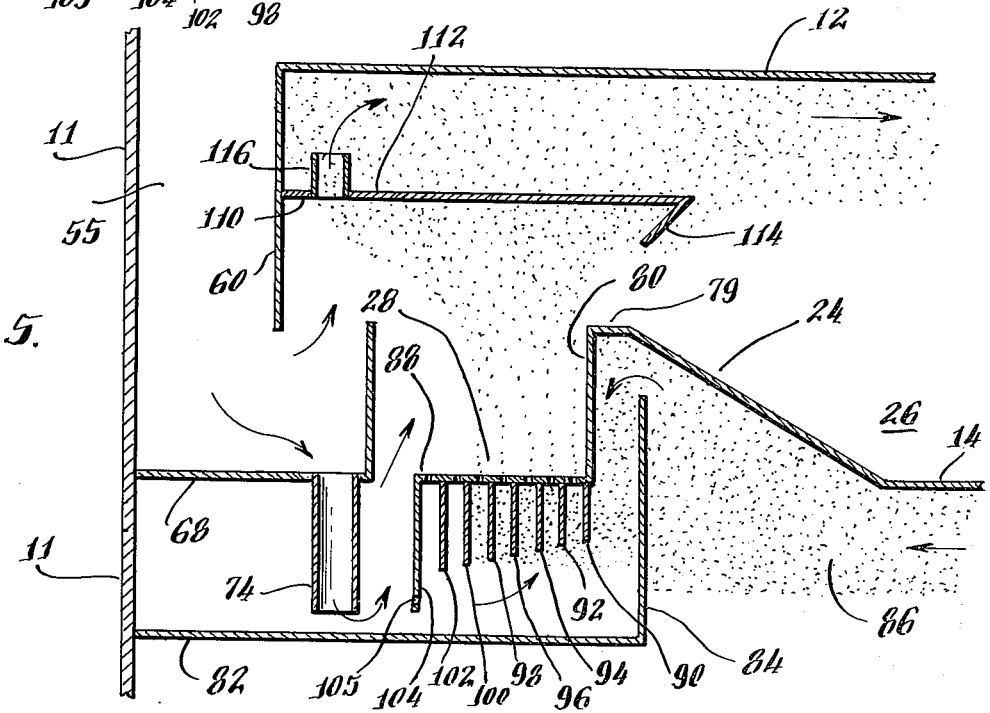

EXTRACTION APPARATUS

BACKGROUND OF THE INVENTION

1. Field of the Invention

This invention relates to extraction systems wherein partially immiscible liquids of differing densities are contacted and are separated by settling. The invention relates more particularly to liquid-liquid extraction towers and to a method and apparatus for improving the efficiency of operation of separation towers.

2. Description of the Prior Art

In a known liquid-liquid extraction technique, a liquid to be treated is contacted with a substantially immiscible liquid solvent. For example, a liquid selective solvent such as phenol may contact a hydrocarbon oil in order to extract aromatic, naphthenic and/or other constituents which are preferentially dissolved in the solvent to form a liquid extract phase. Other constituents such as paraffinic and/or other hydrocarbons remain undissolved and form a liquid raffinate phase which may contain some solvent.

The contacting of a liquid feedstock by the solvent and the resulting extraction are generally carried out in a countercurrent extraction tower. A countercurrent extraction tower comprises an upright column having a plurality of horizontally extending trays which are vertically spaced apart within the column. Spaces existing between the trays are intercoupled for permitting flow through the tower of light and heavy phases by risers and downcomers respectively. Conduits are provided at different locations in the tower for introducing a solvent and a liquid feedstock to the tower and for removing raffinate and extract phases from the tower.

In operation, a relatively light liquid such as a hydrocarbon oil feedstock is introduced to the tower near the bottom and flows between the trays in the tower via the risers from lower to upper spaces in the tower. A relatively heavier liquid such as a solvent is introduced to the tower near the top and flows between the trays in the tower via the downcomers from higher to lower spaces in the tower. Means generally associated with the risers are provided at each tray for intimately dispersing one of the liquids in the other to assist mass transfer of the less desirable, more aromatic components of the oil feed into the solvent phase. A settling zone is also provided in the intertray spaces wherein the resultant dispersion settles to separate the relatively light and heavy liquids.

Various tray arrangements have been provided for use with separating towers of the type described. In a particular form of tray arrangement employed with phenol separating towers and known as an underflow weir tray, the intertray space is segregated into a dispersing zone and a settling zone by a seal box which extends in a generally vertical direction. In operation, a relatively light oil phase collects beneath a surface of a first tray and spills into an associated seal box. The light phase then flows through a vee-notched weir box into the space above the seal box and is dispersed in the relatively heavier phenol solvent extract phase. The light dispersed oil phase coalesces and settles beneath the lower surface of a next upper adjacent tray; the heavier phase settles above the surface of the first tray; and the process is again repeated.

While the underflow weir tray has exhibited relatively good overall operating characteristics, restrictions in oil throughputs and/or phenol treat rates have been imposed in order to limit yield losses which are due to excessive intertray entrainment and entrainment of oil in the bottom extract stream under certain operating conditions. The undesirable entrainment can be traced in some cases to an instability in the tray operation at relatively high throughputs due to the occurrence of a lift phenomena. The density of the fluid in the dispersing zone above the notched underflow weir box is relatively low due to the presence of dispersed droplets and the oil level on one side of the seal box weir is automatically elevated in order to compensate for this decreased density. Although the seal box weir is designed to operate with this lift, the tray becomes unstable when the lift becomes relatively large due to excessive oil in the dispersing zone. In this unstable condition, oil flows more and more rapidly from the seal box into the dispersing zone until the oil is depleted and the phenol phase fills the seal box, stopping the oil flow. After a period of time, the oil phase once again reestablishes itself in the seal box and this cycle is repeated. These cyclic oil flow surges, at several fold the average oil rate, cause excessive mixing, incomplete separation of phases and the referred-to entrainment of oil in the solvent extract phase.

A wide range of factors are believed to contribute to the presence of excessive oil in the mixing zone and to the creation of a lift which is greater than the unit can tolerate. These factors include low oil settling rates, high oil throughput rates, low phenol to oil treating ratio, segregation of the dispersing and settling zones by an excessive seal box height, excessive intertray entrainment (particularly oil in the solvent phase), uncoalesced oil in the seal box due to inadequate coalescence time under the tray, and unstable tray start-up dynamics wherein an overshoot of the equilibrium lift results from the temporary high oil rate as the tray begins to operate.

In some liquid extraction systems such as where the interfacial tension is small, difficulties can be encountered due to poor separation rates and therefore a special tray design is needed to avoid excessive mixing or dispersion and provide suitable conditions for settling and coalescing of droplets.

SUMMARY OF THE INVENTION

It has now been discovered that the sensitivity of an underflow weir tray to slight variations in operating conditions results in large part from a lack of control at the dispersion zone over the rate of light phase flow when variations in the level of light phase occur. As the light phase level beneath the tray increases slightly, for example, the flow area beneath the vee-notched weir increases rapidly, thereby causing a relatively large decrease in flow impedance in response to a relatively small increase in flow rate.

In accordance with the general features of the method of this invention, the light phase in a liquid-liquid extraction tower having vertically spaced cross flow trays and seal box means for dividing the intertray space into dispersing and settling zones is flowed to a tray dispersing zone having a seal box including an aperture and means for automatically varying the effective cross section of the aperture which is presented to the light phase substantially in accordance with variations in the level of light phase beneath a tray thereby maintaining the flow rate of light phase substantially constant for a given set of operating conditions.

In accordance with features of the apparatus of this invention, there is provided in a countercurrent liquid-liquid contacting tower containing a plurality of vertically spaced, cross-flow trays for conducting liquid-liquid extraction between partially immiscible phases of lower and higher density, said trays including a seal box means dividing the space between trays into a dispersing zone and into a settling zone, the improvement comprising a dispersing zone having a seal box including an aperture and means for automatically varying the effective cross section of the aperture which is presented to the light phase substantially in accordance with variations in the level of the light phase beneath the tray thereby maintaining the flow of the light phase substantially constant.

In accordance with more particular features of the apparatus of this invention, a seal box includes a plurality of generally vertically extending weirs having depths which increase progressively in the direction of light phase flow in a cascade arrangement. The weirs depend from a horizontal plate segment which is positioned beneath the dispersing zone. A plurality of apertures are formed in the plate at positions intermediate the weir locations and the light phase flows vertically through a space between adjacent weirs and the apertures into the dispersing zone. With this tray arrangement, the weir array automatically maintains the level or depth of light liquid phase beneath a tray within a desired range of depths and provides for an adequate time for droplet settling and coalescence over a range of light phase flow rates by automatically providing for the introduction or removal from the light phase flow path of an additional weir or weirs as the flow of the light phase is increased or decreased respectively.

In accordance with still another feature of this invention, a baffle plate means is provided and extends through the dispersion zone in a generally horizontal direction for enhancing the operation of the tray.

BRIEF DESCRIPTION OF THE DRAWING

FIG. 3 is an enlarged perspective view of a seal box of FIG. 1 illustrating a weir array constructed in accordance with features of this invention;

FIG. 4 is a side view of the seal box of FIG. 3; and,

FIG. 5 is an enlarged side view of an alternative tray arrangement of FIG. 1.

Referring now to FIGS. 1 and 2, there is illustrated a tower 10 which is formed of a cylindrically shaped metal plate wall, 11, and which is adapted for liquid-liquid contacting of substantially immiscible materials. The tower includes a plurality of trays, three of which are shown as 12, 14 and 16, which extend in a generally horizontal direction and which are vertically spaced within the tower. The trays are fabricated of metal plate and are secured in predetermined positions within the tower by conventional means such as welding. The trays are of the seal box, cascade weir type wherein the intertray spaces are segregated into dispersing and settling zones. The tray 12 includes a seal box 18 having a surface with inclined and level segments 17 and 19, respectively. The seal box 18 segregates the space above the tray 12 into a settling zone 20 and into a dispersing zone 22. The settling zone extends from the vertical surface 23 to a downcomer surface 60, discussed hereinafter. The dispersing zone extends from the vertical surface 23 to an upright segment 25 of a downcomer baffle 66, discussed hereinafter. Similarly, the tray 14 includes a seal box 24 which segregates the intertray space into a settling zone 26 and a dispersing zone 28, and the tray 16 includes a seal box 30 which segregates the intertray space into a settling zone 32 and a dispersing zone 34. Although for convenience in describing this invention only the trays 12, 14 and 16 are illustrated, it is understood that a number of additional trays of the type described may be positioned between the trays 12 and 14.

Figure 1:
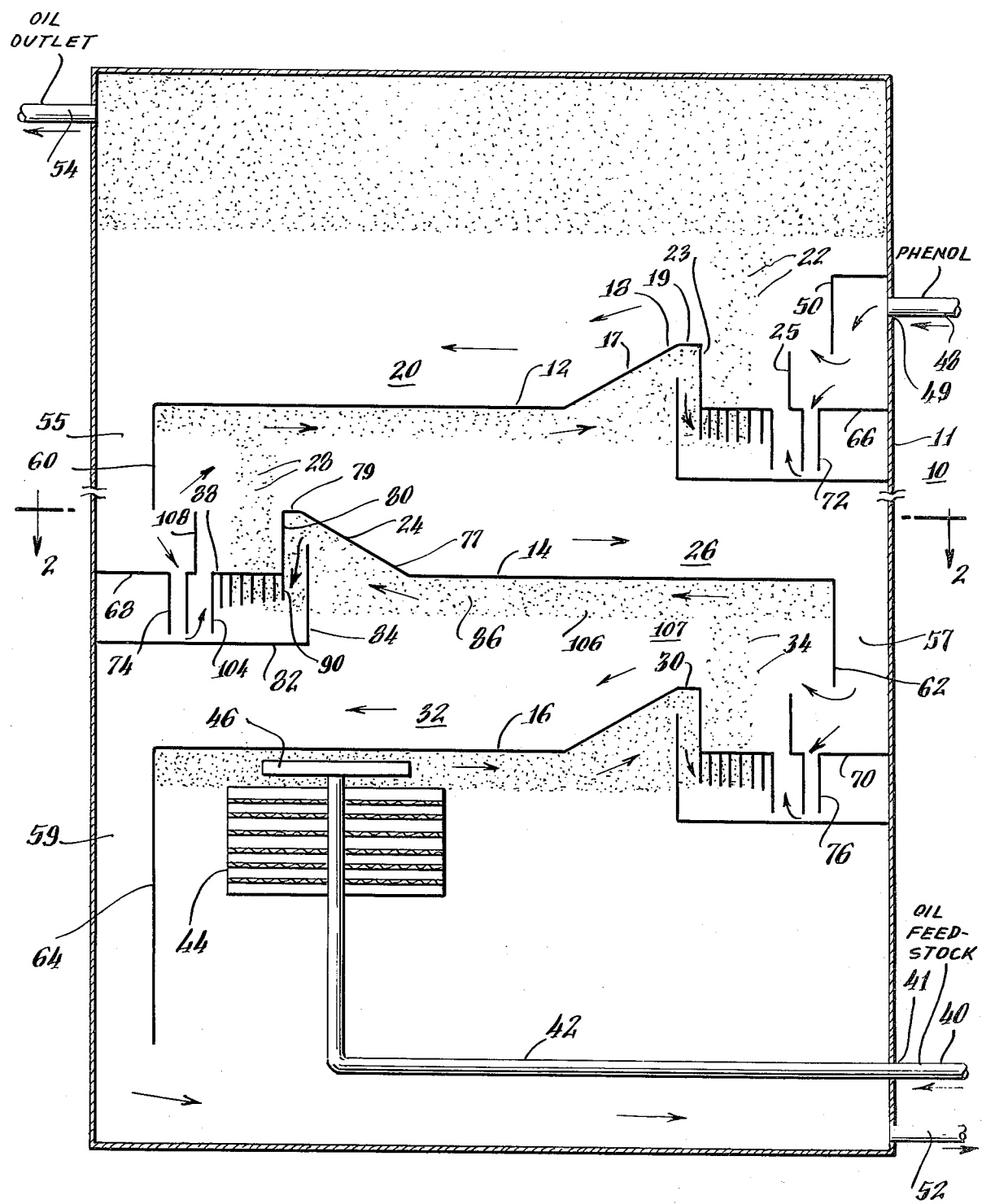
FIG. 1 is a diagram of a liquid-liquid contacting tower constructed in accordance with features of this invention.
Figure 2:
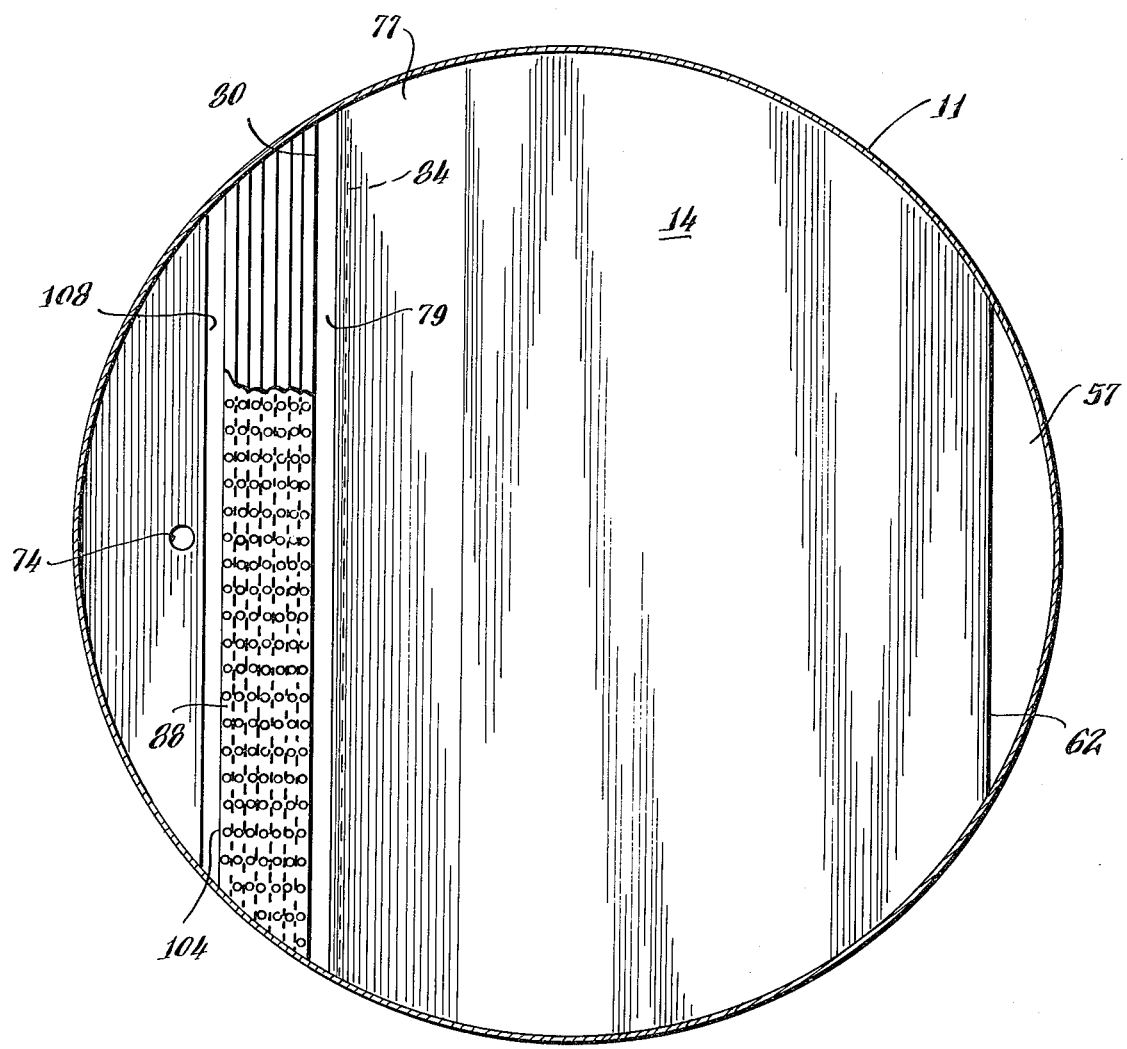
FIG. 2 is a view taken along line 2—2 of FIG. 1.

The tower is continuously charged with a feedstock, such as a hydrocarbon oil through an inlet 40 which extends through an aperture 41 in the tower wall 11. The feedstock flows from the inlet 40 via line 42 which extends to an outlet orifice 46 located beneath a lower surface of the tray 16. A heavy phase liquid solvent, such as phenol, is continuously charged to the tower through an inlet conduit 48 which extends through an aperture 49 formed in the wall at an upper location. Phenol which flows from the aperture 49 is deflected by a metal plate baffle 50 to a seal box baffle and downcomer arrangement discussed hereinafter. The solvent flows through the dispersing zone 22 and past the seal box 18 to the settling zone 20 during the progress of its flow through the tower. A liquid extract phase is withdrawn from the tower at an extract outlet aperture 52 formed in the wall 11 at a lower location. A relatively lighter phase or raffinate phase is also withdrawn from the tower at an outlet aperture 54 which is located in an upper sector of the tower wall 11.

Each tray assembly includes a downcomer and a riser assembly, the latter being defined generally by the seal box. The downcomers 55, 57 and 59 of FIG. 1 are shown to comprise portions of the tower wall 11 and adjacent metal plate segments 60, 62 and 64 respectively which are supported by, and, depend from the trays 12, 14 and 16 respectively. The downcomers provide a flow path between the trays for the relatively heavier phase liquid between the upper and lower sections of the tower 10. For example, the downcomer 55 provides a flow path to an intertray space between the trays 12 and 14 from the settling zone 20 in the space above the tray 12. In order to inhibit agitation of the light phase which is located in the seal box of each tray, the baffles 66, 68 and 70 are provided for the trays 12, 14 and 16 respectively at locations opposite the inlet baffle 50, the downcomer 55, and the downcomer 57 respectively. In order to provide for the introduction of a small amount of settled heavier phase into the seal box, downcomers 72, 74 and 76 are provided and extend from baffle plates 66, 68 and 70 respectively and terminate above a seal pan segment of the seal box. These latter downcomers comprise conduits for conveying some heavier phase to the seal boxes without agitating and causing an entrainment of heavier phase with the lighter phase as the latter passes up through the apertures.

Referring now to FIGS. 3 and 4, the seal box 24 of FIG. 1, which is exemplary, is illustrated in greater detail. It is understood that the seal boxes 18 and 30 of the upper and lower adjacent trays 12 and 16 respectively as well as other seal boxes which can be included in the tower have a similar structure. The seal box 24 restricts undesirable recirculation of the heavy phase from the settling zone 26 back into the mixing zone 28 of the tray 14 and permits the flow of light phase from beneath the tray into the dispersing zone 28. The seal box additionally provides a seal which prevents the heavy phase, located at a tray above, from flowing in the reverse direction through the dispersing zone and thus bypassing the tray. As indicated hereinbefore, the seal box includes a weir or dam having an inclined surface 77 and a level surface 79 and extends generally in a vertical direction from the average level of the tray. A seal pan 82 is provided and a segment 84 extends in a generally vertical direction into a volume occupied by the dam 80. The segment 84 functions as a seal baffle over which the light phase 86 rises and flows into the volume above the seal pan 82. As is known, the light phase will rise and flow over the weir 84 because of the lower density of the light phase with respect to the solvent phase.

In accordance with a feature of the invention, the seal box further includes a horizontally extending plate 88 from which an array of vertically depending plates 90–104 are supported in the flow path of the light phase. A plurality of apertures are formed in the thickness of the plate 88 and provide for dispersion of the light phase from an area beneath the plate 88 into the heavier phase in the dispersing zone 28. The dispersed light phase rises and coalesces beneath the lower surface of the next upper adjacent tray or, alternatively, near the upper section of the tower from which location it is withdrawn from the tower.

The array of depending plates 90–104, referred to herein as cascade weirs, are arranged in cascade in a manner for providing that the depths of plates which are successively positioned in the flow path of the light phase increase slightly and progressively toward the end plate 104. These cascade weirs, as well as the seal box, etc., extend from one side of the cylindrical tower to the other side in a chordal manner. The light phase as viewed in FIGS. 1 and 4, flows from right to left beneath the lower surface of the tray 14. It flows over the seal baffle 84 into the seal box and will spill under more or less of the cascade weirs 90, 92, 94, 96, 100, 102 and 104, as the level of the light phase beneath the tray 14 tends to increase, depressing the interface 106 between the light phase 86 and the phenol phase 107, the light phase within the seal box will automatically spill under successively more cascade weirs and flow through additional corresponding apertures in the plate 88. As the quantity of the light phase beneath the tray 14 tends to decrease, the light phase within the seal box underflows fewer cascade weirs and fewer outlet apertures are therefore provided for flow of the light phase through the plate 88. There is thus presented to the light phase a flow restricting means which automatically maintains a stable flow rate of the light phase, substantially constant with time for a given set of operating conditions, while at the same time providing an automatic means of adjusting the number of apertures available to the light phase as the oil feed rate varies upward or downward. An important feature of this cascade weir arrangement is that this variation in available area is accomplished entirely automatically by hydraulic balance and does not require any moving parts. The level of the light phase beneath the tray is thus maintained within a relatively narrow range of levels thereby providing a time for droplet settling and coalescence which is substantially independent of flow rate.

Intertray and bottoms entrainment for the arrangement described and claimed herein are lower than known underflow weir tray configurations. More particularly, in a simulated operation, the tray described and claimed herein exhibited a 4% oil entrainment at an oil rate of 100 barrels per day per sq. ft. while an improved conventional underflow tray exhibited a 9% oil entrainment at 70 barrels per day per sq. ft. Oil entrainment in the bottoms phenol sample was relatively low for the invention described and claimed herein since additional separation occurs beneath the bottom tray. Values of about 1% or less for the invention described and claimed herein and the improved tray referred to were observed corresponding to the above conditions. This can be compared to a value of about 10% for a prior unstable underflow weir tray operating at about 40 barrels per day per sq. ft. For relatively longer Modified Herschel Demulsibility times, entrainment values increased more rapidly for the improved conventional tray than for the invention described and claimed herein. Phenol entrainment in the oil phase after settling under the tray and just prior to redispersion to the tray above was observed and it was found that phenol entrainment increased approximately linearly with oil rate for the invention described and claimed herein and for the improved conventional tray. However, at a rate of 50 barrels per day per sq. ft., the arrangement of the present invention showed approximately 6% entrainment as compared with a 15% entrainment for the improved conventional tray.

Various advantages attend the use of the tray arrangement thus far described. The cascade weirs which form a part of the distributor of disperser provide level stabilization. A level baffle, which was heretofore required with underflow trays, is thus eliminated. As a result, maximum coalescence time is provided; no redispersion of the oil occurs under the tray and the "lift" effect which causes the underflow weir tray to be unstable at relatively high oil rates is counter-acted because the oil flow's rate is restricted through the apertures. This is accomplished in combination with the desirable seal box which, with its isolating mixing zone provides relatively good mixing and settling characteristics.

The tray design has a number of additional advantageous features. The light phase can spill past the last weir 104 (FIG. 3) and through apertures 105 formed therein if the apertures in plate 88 become overloaded because of an excessively high flow rate. The downcomers provide a positive seal against rising light phase drops. The seal pan downcomers eliminate dead zones beneath the seal pans and coalescence promoting materials can be effectively used beneath the bottom tray. The possibility of plugging the spaces beneath the weirs with foreign matter is substantially reduced with the weir array and there is essentially no pressure drop with the array. A pressure drop is established across the aperture plate. Flow through the aperture plate 88 is essentially turbulent and the discharge coefficient is relatively insensitive to viscosity variations in the light phase.

An important advantage of the tray arrangement described and claimed herein is the elimination of the unstable condition experienced in prior underflow weir trays while simultaneously maintaining a relatively large effective dispersion or mixing zone. The seal box dam which extends about 9 inches above the tray's surface between the mixing and settling zones permits the location of the aperture plate 88 at tray level. Thus, the bottom of the mixing zone in the described arrangement is essentially at tray level thereby providing for the utilization of a relatively large space above the tray for mixing while avoiding recirculation of the heavy phase from the settling zone. More particularly, the mixing zone height as measured from a plate 88 is always greater than 10 inches.

A build-up of uncoalesced oil droplets in the tower and subsequent entrainment in the phenol phase is substantially reduced by the use of a coalescer (FIG. 1) beneath the tray 16. The coalescence rates are increased by virtue of the added surface area and oil wettability characteristics provided by the coalescer 44. The coalescer, which is positioned beneath the tray 16, coalesces oil droplets which become entrained in phenol phase from the tray above. An emulsion build-up under this tray is substantially reduced and, as a result of the proper disengagement of oil droplets in the phenol phase leaving the tower, entrainment value is less than 1% where noted under all conditions. The coalescer comprises, for example, steel screens 106 which are mounted to and supported on the oil feedstock inlet tube 42 at a location beneath the outlet 46 below tray 16.

Relatively large towers of the type of about 25 feet in diameter generally utilize a relatively large intertray spacing which can be on the order of about 36 inches. When the intertray spacing is of this magnitude, the mixing height existing between adjacent trays is relatively large, there is a substantially large quantity of mixing energy, and the emulsion formed as a result of this relatively large quantity of mixing becomes relatively stable and fails to settle. In addition, when the mixing height is on the order of about 36 inches, a relatively large amount of liquid is recirculated from the settling zone to the mixing zone and hampers the settling process.

In accordance with another feature of the invention, a striker plate baffle 110 (FIG. 5) is provided and is positioned in the dispersion zone above the aperture plate 88. The baffle includes a generally planar segment 112, and a folded-back lip 114 near the edge of the plate 110. In a typical arrangement, the lip 114 will extend in a vertical direction for about 6 inches. A portion of the emulsion breaks and the settled oil flows up through the riser pipes 116 to the underside of the tray above it. However, the pipes are sized so as not to pass all of the emulsion and the remainder of it passes under the edge of the lip 114 into the main settling zone. The use of this striker plate baffle particularly enhances emulsion settling, reduces the recirculation from the settling zone to the mixing zone, and provides a significant percentage of extra surface area for the oil to settle out of the emulsion phase. The use of this striker plate effectively adds from about 25 to 35% to the effective area of the tower and significantly reduces the intertray entrainment.

Table I illustrates the enhanced reduction in entrainment when a striker plate is employed for an intertray spacing of 36 inches as compared with a tower not utilizing the striker plate baffle and having intertray spacings of 24 inches and 36 inches. A significant increase in oil entrainment accompanies the increase in spacing from 24 inches to 36 inches without the use of a baffle. However, the performance of the tower with 36 inch spacing as seen from the table can be made substantially close to that of the 24 inch spacing by the use of the baffle described herein.

TABLE I

PERCENT OIL ENTRAINED IN PHENOL PHASE FOR VARIOUS CASCADE WEIR TRAY CONFIGURATIONS

| Tray Configuration | % Oil in Phenol Phase In Downcomer Zone | |
|---|---|---|
| | (1) | (2) |
| 24" Tray Spacing | 5 | 2½ |
| 36" Tray Spacing | 18 | 9 |
| 36" Tray Spacing With Striker Baffler | 5 | 2 |

(1) Flow conditions equivalent to 40 B/D/ft$^2$ oil rate and 200% phenol treat.
(2) Flow conditions equivalent to 24 B/D/ft$^2$ oil rate and 300% phenol treat.

There has thus been described an improved method and apparatus for liquid-liquid contacting and separation in a contacting tower employing cross-flow trays having seal boxes with cascade weirs. The method and apparatus are particularly advantageous in that they automatically vary the effective flow surface cross sectional area presented to a light phase thereby maintaining the flow rate substantially constant with time and consequently maintaining the depth of the light phase beneath the tray within a relatively small, acceptable range.

What is claimed is:

1. In a vertical separating tower wherein first and second partially immiscible liquids of relatively high and low density respectively are charged to the tower and contacted thereby separating said liquids into a relatively light raffinate phase and a relatively heavier extract phase, said tower having a plurality of vertically spaced trays, a space between said trays wherein said raffinate phase settles into a layer which flows beneath a lower surface of said trays and said extract phase settles into a layer which flows above an upper surface of said trays and downcomer means associated with each tray for providing a flow path for said first liquid or said extract phase from a location above a tray to a location beneath said tray and riser means associated with each tray for providing a flow path for said second liquid or raffinate phase from a location beneath a tray to a location above said tray, said riser means being horizontally spaced apart from said downcomer means and said riser means further comprising a seal box means adapted for laterally separating the space above a tray into a dispersing zone and into a settling zone, said seal box means including aperture means comprising a surface having a plurality of apertures formed therein for more effectively dispersing said light liquid or said raffinate phase passing therethrough, the improvement comprising a horizontally extending striker baffle plate positioned in the intertray space above said riser means, said striker baffle plate including means for the flow therethrough of only a portion of the raffinate phase which flows through the riser means from below, said striker plate including a flange segment forming an edge thereof and extending toward a principal bodied portion of the striker plate.

2. In the apparatus of claim 1, the improvement further comprising:
   a. a substantially horizontal downcomer baffle positioned opposite the outlet of said downcomer means for inhibiting agitation of said raffinate phase in said in said seal box means; and b. a substantially vertical baffle positioned between said riser means and said downcomer means and extending upwards from said downcomer baffle to a point near the lower portion of said downcomer means for preventing said light liquid or raffinate phase from going up said downcomer means and for providing a substantially positive seal between said downcomer means and raffinate phase lying beneath the surface of a next upper adjacent tray.

3. The separating tower of claim 2 wherein said tower includes a lower plate thereof, and coalescence promoting means positioned below a bottom surface of said lower tray, said coalescence means comprising a vertical array of horizontally extending screens.

4. In the apparatus of claim 1, the improvement wherein said seal box means includes means for automatically varying the effective cross-sectional area of said aperture means which is presented to the raffinate phase substantially in accordance with variations occurring in the level of said raffinate layer beneath said tray thereby maintaining a substantially constant flow rate of said raffinate phase.

5. In the apparatus of claim 4, the improvement wherein said means for automatically varying the effective cross-sectional area of said aperture means comprises a surface having a plurality of apertures formed therein and an area of generally vertically extending weirs depending from said surface and having depths which increase progressively in the direction of flow of said raffinate phase.

6. In the apparatus of claim 5, the improvement wherein said apertured surface includes an array of rows of aperture holes and said depending cascade weirs are positioned for providing a flow path through more or less rows of said aperture holes as the level of the layer of said second light liquid or raffinate phase changes with the feed rate to the tower and/or the raffinate yield.

7. In the apparatus of claim 6, the improvement wherein said seal box means includes a seal pan and a seal box weir which define a space which is separated from the liquids beneath the associated tray and a last one of said array of depending weirs is spaced from a surface of said seal pan for providing a flow path for said second light liquid or raffinate phase upon overloading of said seal box means.

8. In the apparatus of claim 7, the improvement including a downcomer extending from said downcomer baffle into said seal box means and terminating near a seal pan of said seal box for conveying heavy phase to said seal box.

9. In the apparatus of claim 8, the improvement wherein said vertical baffle comprises an upright segment of said downcomer baffle.

* * * * *